UNITED STATES PATENT OFFICE.

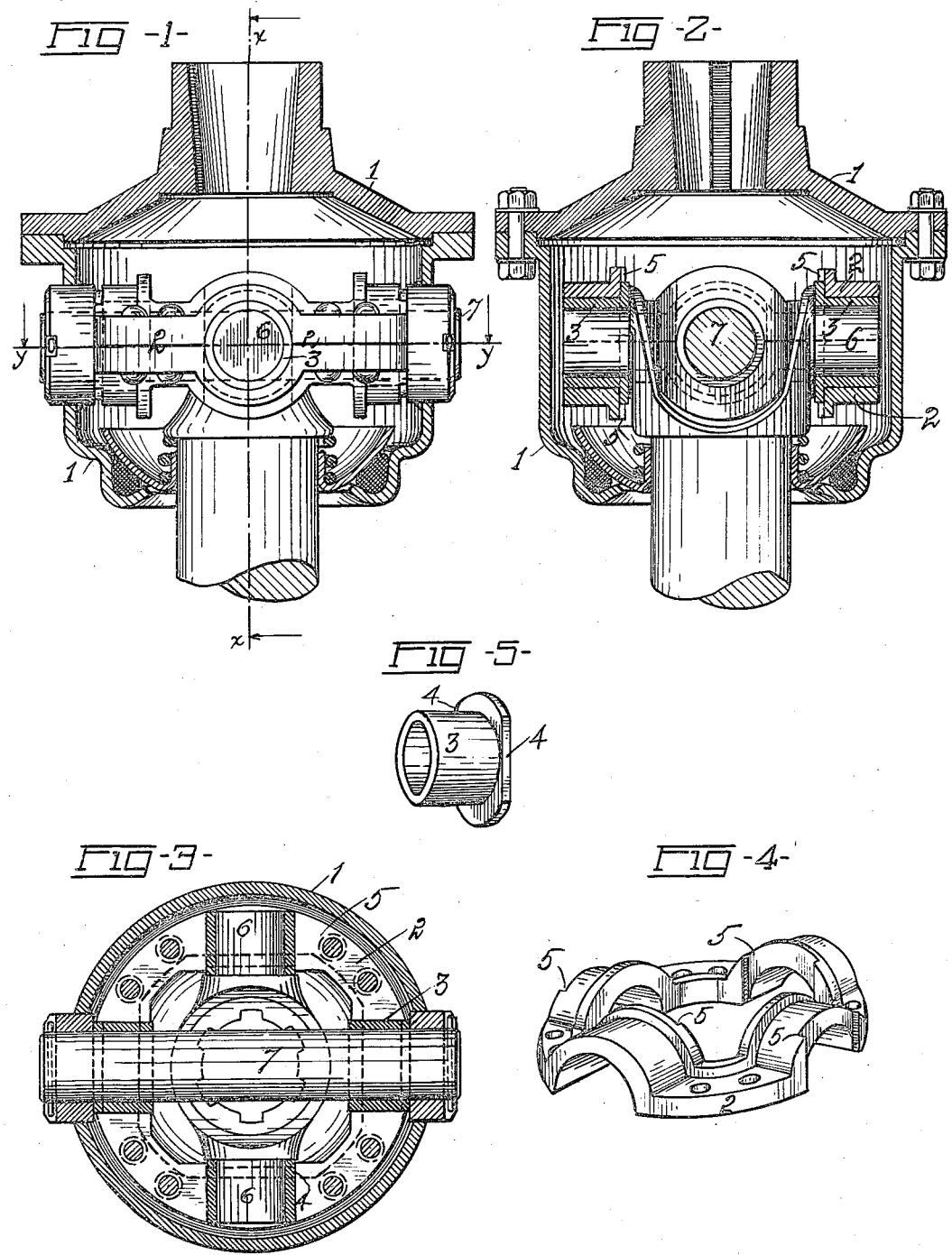

BERTIS H. URSCHEL, OF BOWLING GREEN, OHIO.

UNIVERSAL JOINT.

1,309,826.  Specification of Letters Patent.  Patented July 15, 1919.

Application filed April 14, 1919. Serial No. 290,027.

*To all whom it may concern:*

Be it known that I, BERTIS H. URSCHEL, a citizen of the United States, residing at Bowling Green, in the county of Wood and State of Ohio, have invented certain new and useful Improvements in Universal Joints; and I do declare the following to be a full, clear, and exact description of the invention, such as will enable others skilled in the art to which it appertains to make and use the same, reference being had to the accompanying drawings, and to the figures of reference marked thereon, which form a part of this specification.

In universal joints the opposed ends of the driving and driven shafts are usually provided with journals which permit the shafts to be angularly deflected. When the bearings for the shafts or pins of these journals consist of a sleeve or bushing it is necessary that the sleeve or bushing be secured against turning in its housing or ring, which is usually forged. In some constructions the sleeve or bushing is forced into and held in place with a press fit. In the event that grit gets into such a bearing, the bushing and pin or shaft seize upon each other, causing the bushing to turn on its outside bearing and to cut out and ruin the forging. Now, in case of repairing, it will be necessary to replace the forgings as well as the pins and bushings, an expensive and tedious task. To prevent the turning of the bushings, dowels are sometimes employed, but these frequently become loosened and they add to the multiplicity of parts.

My invention is designed to obviate the objections and difficulties here indicated, and to provide, as bearings for the pins or shafts of universal joints, a sleeve or bushing which without the use of cotters or the employment of any additional part is, under all circumstances, rigidly held against turning about its axis.

For the purposes of illustration I have shown, in the accompanying drawings, the bushing referred to as applied to the universal joint for which Letters Patent of the United States were granted to me July 23, 1918, Number 1,273,289, it being understood, of course, that the device may be used in any universal joint employing bushings for the pins or shafts.

In said drawings, Figure 1 is a side-elevation of the universal joint referred to, with half of the shell or casing disclosed in central longitudinal section; Fig. 2, the same, seen at a right-angle to the view in Fig. 1, and taken on line $x$—$x$; Fig. 3, a sectional plan-view, taken on line $y$—$y$, Fig. 1; Fig. 4, a perspective view of one of the ring-parts hereinafter referred to, detached, and Fig. 5, a perspective view of my improved bushing or sleeve, detached.

Like numerals of reference indicate like parts throughout the drawings.

In the drawings, 1 is a shell having opposed axial openings, one being for the driving shaft, the other for the driven shaft. Each shaft terminates as a yoke, the two yokes being disposed in planes at a right-angle to each other, the terminal of the yokes being journaled in the same plane, in a manner which will be understood without further description. 2 is a ring having four equi-distant holes for the reception of bearing-bushings. The ring, in the present instance, is made up of two ring-parts clearly shown in Fig 3 in plan-view, and in perspective in Fig. 4, the ring parts being securely but detachably fastened together by bolts or rivets passing through registering holes. The pairs of holes in the ring, for shaft-openings, are in exact axial alinement. Two bushings 3, shown in Fig. 5, the bearing surface of which is hardened and highly polished, are closely fitted into two of the opposed shaft-openings, with their flanges resting against the inner side of the ring, and two other bushings are in like manner fitted into the other two shaft-openings, with their flanges pressing against the outer side of the ring. Each of the bushing-flanges is mutilated by having a segmental portion cut away, leaving two parallel straight edges 4, as shown in Fig. 5. That portion of the ring against which the flanges of the bushings rest is recessed, as at 5, to receive the straight edges of the cut away portions of the segment-flanges, as illustrated clearly in Fig. 4. Each of the arms of one of the yokes carries a gudgeon or trunnion 6 which fits with a working fit in the bearings formed by two of the opposed bushings, the trunnions pressing outwardly against the flanges of the bushings. A shaft 7 passes through the other pair of bushings, the ends of this shaft being secured to the other yoke 8 which presses inwardly upon the flanges of the bushings. Thus, by means of the recesses 5 in the rings, which recesses engage the straight edges of the bushing-flanges, and by disposing one pair of flanges on the inside of the ring and the other pair of flanges on the outside of the ring, in engagement with the two yokes above mentioned, the bushings are held against movement either in the direction of or about their axes, and wholly without the employment of any additional part.

Having described my invention, what I claim and desire to secure by Letters Patent is—

1. In a universal joint, a member having a hole adapted for the reception of a bushing, in said opening a bushing having a flange the edge of which has two parallel straight portions, said member being recessed for engagement with said straight edge-portions of the flanges, whereby the bushing is prevented from turning.

2. In a universal joint, a member having four equidistant holes, in each of said holes a flanged bushing, two of said opposed bushings having their bushings turned toward each other, the other two bushings having their flanges turned away from each other, the edge of each of said flanges being mutilated and engaged with a corresponding portion of said member.

3. In a universal joint, members providing four equidistant holes for shaft-bearings, in each of said holes a bushing having a mutilated flange engaged with said member to prevent the turning of the bushing, and yoke-members bearing against said flanges to prevent the movement of the bushings in the direction of their several axes.

In testimony whereof I affix my signature in presence of two witnesses.

BERTIS H. URSCHEL.

Witnesses:
REASEL ORDWAY,
C. V. URSCHEL.